United States Patent [19]
Gottschalk

[11] 4,246,766
[45] Jan. 27, 1981

[54] VIBRATION-DAMPENING FLEXIBLE COUPLING

[75] Inventor: Robert E. Gottschalk, Los Angeles, Calif.

[73] Assignee: Panavision, Incorporated, Tarzana, Calif.

[21] Appl. No.: 947,491

[22] Filed: Oct. 2, 1978

[51] Int. Cl.³ .............................................. F16D 3/58
[52] U.S. Cl. .............................. 64/11 R; 64/27 NM; 64/31
[58] Field of Search ............... 64/11 R, 11 B, 11 P, 64/27 NM, 6, 15 R, 19, 21, 31

[56] References Cited

U.S. PATENT DOCUMENTS

| | | | |
|---|---|---|---|
| 809,903 | 1/1906 | Bowers | 64/11 R |
| 1,244,533 | 11/1917 | Morse | 64/31 |
| 2,626,812 | 1/1953 | Jones | 64/31 |
| 2,643,528 | 6/1953 | Hammarbach | 64/15 R |
| 2,929,231 | 3/1960 | Bank | 64/11 R |
| 2,950,609 | 8/1960 | Goodloe | 64/15 R |
| 3,144,257 | 8/1964 | Walker | 64/31 |
| 3,224,224 | 12/1965 | Kudriavetz | 64/11 R |
| 3,393,535 | 7/1968 | Morin | 64/11 R |
| 3,405,539 | 10/1968 | Tanaka | 64/15 R |

*Primary Examiner*—Ira S. Lazarus
*Attorney, Agent, or Firm*—Lyon & Lyon

[57] ABSTRACT

A flexible coupling member is constructed from a length of elastomeric cylindrical tubing. The opposite ends of the tubing are closed by axially spaced ribs positioned at right angles, and the outer surfaces of the flexible coupling between the ribs are bounded by smooth warped surfaces. The interior of the coupling may be hollow or solid. If hollow, a check valve may be provided in one of the end ribs or on one of the smooth warped surfaces, to control internal pressure.

9 Claims, 9 Drawing Figures

VIBRATION-DAMPENING FLEXIBLE COUPLING

This invention relates to flexible couplings of the type used to connect rotary driving and driven members which have some parallel misalignment or angular misalignment or both. As an illustrative example, such a flexible coupling may be used between the motor and the "movement" of a motion picture camera. The coupling should be quiet in operation and capable of accommodating parallel or axial misalignment or both.

In accordance with this invention, the preferred form of the flexible coupling comprises a "cylindroid" or "bilateral wedge" having axially spaced ribs at opposite ends positioned at right angles. The ribs are joined and connected by smooth warped surfaces.

The coupling device may be constructed from a length of elastomeric cylindrical tubing. One end of the tubing is squeezed by jaws along an axis and the other end of the tubing is squeezed by jaws along a perpendicular axis. The flattened ends or ribs thus provided are sealed by heat or by use of a suitable adhesive or sealant. In this construction, the walls which form the warped surfaces are of substantially uniform thickness, while the end ribs are of greater thickness.

While the flexible coupling may be hollow or solid, the hollow form may be provided with a check valve for pressurizing the interior of the coupling.

Other and more detailed objects and advantages will appear hereinafter.

Figure 1:
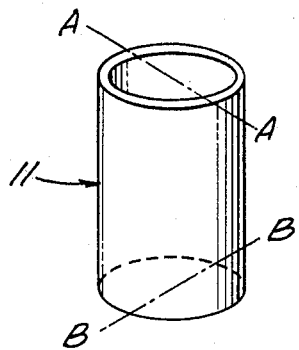
FIG. 1 shows a tubular blank formed of elastomeric material which may be used to form the principal component of the present invention.
Figure 2:
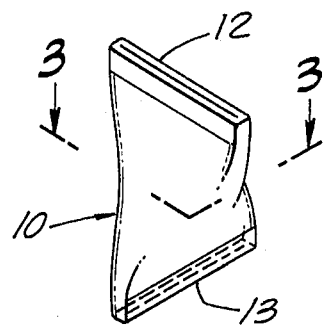
FIG. 2 is a perspective view showing a preferred embodiment of the principal component of the present invention.

Referring to the drawings, the flexible coupling member generally designated 10 may be constructed from a length of plastic tubing 11 such as shown in FIG. 1. One end of the tubular blank is squeezed between jaws (not shown) along the axis A—A, and the other end of the blank is squeezed by jaws along the perpendicular axis B—B. The flattened ends or ribs 12 and 13 thus provided are sealed by heat or by use of a suitable adhesive or sealant. The general form is that of a solid bounded by warped surfaces, and it may be referred to as a "cylindroid" or "bilateral wedge." The essential characteristic is that the end ribs 12 and 13 are axially spaced and positioned at right angles and that they are joined by smooth, warped surfaces. The interior of the preferred form of the coupling member 10 is hollow to form a flexible body.

Figure 4:
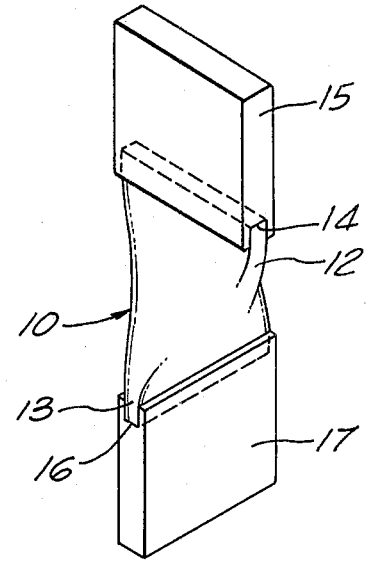
FIG. 4 is a perspective view showing one form of the complete coupling embodying this invention.
Figure 3:
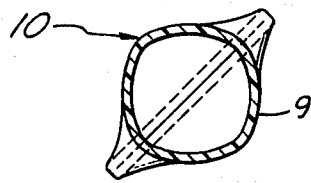
FIG. 3 is a sectional plan view taken substantially on the lines 3—3 as shown in FIG. 2.

As shown in FIG. 4, the coupling 10 may be used by confining the end rib 12 within a groove 14 on one block member 15, and confining the other end rib 13 within the groove 16 formed in another block member 17. One of the block members is turned by any suitable means and the convex body 9 of the coupling 10 provides a resilient drive to the other block member. The flexible body 9 extends between the end ribs 12 and 13, the body 9 being bounded by smooth warped surfaces and being convex midway between said end ribs. Apparatus for gripping the block members 15 and 17 may take any suitable or desirable form.

Figure 5:
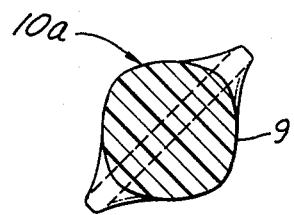
FIG. 5 is a sectional view similar in outline to the coupling of FIG. 3 but formed of solid material.

The modified form of coupling member 10a shown in FIG. 5 has end ribs at right angles to each other, but the device is not hollow. Instead, it is cast in a mold or otherwise formed without any central cavity, but the outer warped surfaces are the same as that previously described. The coupling 10a is not as flexible and it has higher torque transmitting capabilities.

Figure 6:
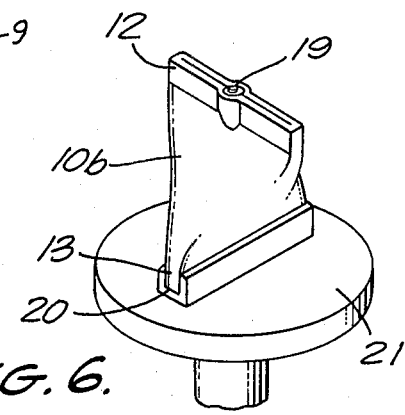
FIG. 6 is a perspective view showing a modified form of the major component of this invention, provided with a valve for varying the internal pressure.
Figure 7:
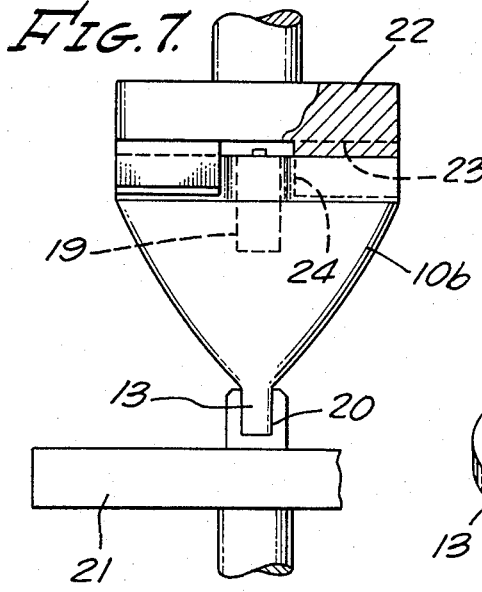
FIG. 7 is a side elevation of the device shown in FIG. 6.

The modified form of coupling 10b shown in FIGS. 6 and 7 employs a check valve 19 which may be of the conventional form used on automobile tires and tubes. This check valve 19 is mounted centrally of the end rib 12 and provides a means of pressurizing the hollow interior of the coupling to any desired extent to increase its torque carrying capacity. The end rib 13 is received within a groove 20 provided on a driving or driven member 21. Another such driving or driven member 22 has a groove 23 the walls of which are interrupted at a central location 24 to straddle and give clearance to the valve 19. The valve 19 is seen to be coaxial with the rotational axis of the coupling.

Figure 8:
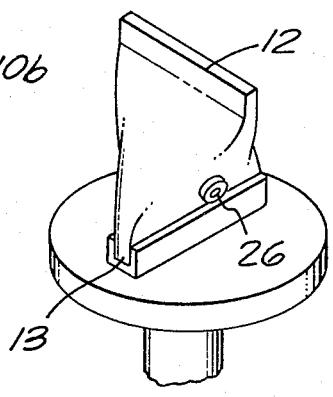
FIG. 8 is a perspective view showing another modification.
Figure 9:
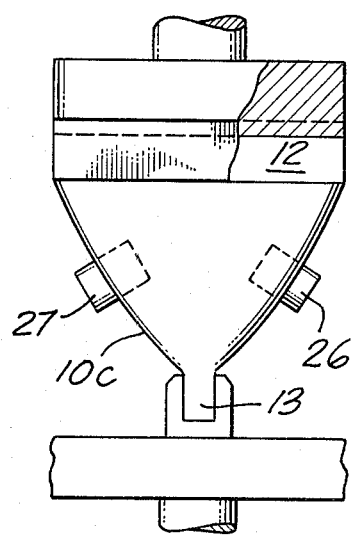
FIG. 9 is a side elevation of the device shown in FIG. 8.

The modified form of the coupling 10c shown in FIGS. 8 and 9 is similar to the coupling 10b in that the internal pressure can be changed by means of the check valve, but the valve 26 is mounted on the outer warped surface of the coupling rather than on its rotational axis. A duplicate valve 27 or an equivalent balancing weight is mounted on the other side of the coupling 10c at a 180 degree spacing in order to balance out any eccentric weight. An advantage of the coupling 10c is that the check valve 26 is accessible without dismantling the coupling from its driving or driven member.

Having fully described my invention, it is to be understood that I am not to be limited to the details herein set forth but that my invention is of the full scope of the appended claims.

I claim:

1. A flexible coupling for connecting a driving member to a driven member, the coupling being formed of elastomeric material in the shape of a cylindroid having axially spaced straight end ribs positioned at right angles, and a flexible body extending between said end ribs, said body being bounded by smooth warped surfaces and being convex midway between said end ribs.

2. The coupling defined in claim 1 having a hollow interior.

3. The coupling defined in claim 2 having walls of uniform thickness defining the warped surfaces of the body.

4. The coupling defined in claim 1 having a solid interior.

5. The coupling defined by claim 1 having a hollow interior.

6. A flexible coupling for connecting a driving member to a driven member, the coupling being hollow and formed of elastomeric material in the shape of a cylindroid having axially spaced straight end ribs positioned at right angles, a flexible body extending between said end ribs, said body being bounded by smooth warped surfaces and being convex midway between said end ribs, and means including a valve for pressurizing the hollow interior of the coupling.

7. The coupling defined in claim 6 in which the valve is positioned centrally of one of said ribs.

8. The coupling defined in claim 6 in which the valve is mounted on one of the warped surfaces.

9. For use in connecting a driving member to a driven member, a flexible coupling member constructed from a length of elastomeric cylindrical tubing, the opposite ends of the tubing being closed by ribs positioned at right angles, the outer surfaces of the flexible coupling between the end ribs being bounded by smooth warped surfaces.

* * * * *

UNITED STATES PATENT AND TRADEMARK OFFICE
CERTIFICATE OF CORRECTION

PATENT NO. : 4,246,766
DATED : January 27, 1981
INVENTOR(S) : Robert E. Gottschalk It is certified that error appears in the above-identified patent and that said Letters Patent are hereby corrected as shown below:

Column 1, line 66, after "surfaces" and before the period insert --to form a flexible body--.

Column 1, lines 67 and 68, delete "to form a flexible body".

Column 2, line 24, "mean" should read --means--.

Signed and Sealed this

Twenty-first Day of April 1981

[SEAL]

Attest:

Attesting Officer

RENE D. TEGTMEYER

Acting Commissioner of Patents and Trademarks